(12) United States Patent
Seol (10) Patent No.: US 11,590,952 B2
(45) Date of Patent: Feb. 28, 2023

(54) METHOD FOR CONTROLLING ESC INTEGRATED BRAKING SYSTEM

(71) Applicant: Hyundai Mobis Co., Ltd., Seoul (KR)

(72) Inventor: Yong Cheol Seol, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 298 days.

(21) Appl. No.: 16/916,484

(22) Filed: Jun. 30, 2020

(65) Prior Publication Data

US 2021/0001829 A1 Jan. 7, 2021

(30) Foreign Application Priority Data

Jul. 2, 2019 (KR) .................. 10-2019-0079194

(51) Int. Cl.
| | | |
|---|---|---|
| *B60T 13/68* | (2006.01) | |
| *B60T 17/22* | (2006.01) | |
| *B60T 8/171* | (2006.01) | |
| *B60T 7/04* | (2006.01) | |
| *B60T 8/1755* | (2006.01) | |
| *B60T 7/06* | (2006.01) | |

(52) U.S. Cl.
CPC ............ *B60T 13/686* (2013.01); *B60T 7/042* (2013.01); *B60T 7/06* (2013.01); *B60T 8/171* (2013.01); *B60T 8/1755* (2013.01); *B60T 17/22* (2013.01)

(58) Field of Classification Search
CPC ...... B60T 17/22; B60T 2220/04; B60T 8/171; B60T 8/1755; B60T 8/32; B60T 13/686; B60T 13/745; B60T 7/042; B60T 7/06
USPC ......................................................... 701/70
See application file for complete search history.

(56) References Cited

U.S. PATENT DOCUMENTS

| | | | |
|---|---|---|---|
| 8,479,850 B2 * | 7/2013 | Nakata ................ | B60T 8/4081 |
| | | | 180/65.29 |
| 2006/0158033 A1 | 7/2006 | Ohkubo et al. | |
| 2010/0256885 A1 * | 10/2010 | Logan ................ | B60T 1/10 |
| | | | 701/70 |
| 2011/0025119 A1 * | 2/2011 | Nishino ............... | B60T 13/745 |
| | | | 303/3 |
| 2011/0241418 A1 * | 10/2011 | Nozawa ............... | B60T 13/586 |
| | | | 303/3 |

(Continued)

FOREIGN PATENT DOCUMENTS

| | | | | |
|---|---|---|---|---|
| CN | 1807165 | | 7/2006 | |
| CN | 108501909 A | * | 9/2018 | |
| CN | 112172769 A | * | 1/2021 | ............ B60T 13/686 |
| JP | 2011031698 A | * | 2/2011 | ............. B60L 11/14 |
| KR | 1997-0000784 | | 1/1997 | |

OTHER PUBLICATIONS

Office Action dated Jun. 17, 2022 from the Chinese Patent Office for Chinese Patent Application No. 202010619073.4.

*Primary Examiner* — Atul Trivedi
(74) *Attorney, Agent, or Firm* — H.C. Park & Associates, PLC (57) ABSTRACT

A method for controlling an ESC integrated braking system including: checking, by a control unit, whether a brake is in an on state or a standby state as the braking system is activated; checking, by the control unit, whether a current temperature value is in a low temperature state lower than specified reference temperature; and controlling, by the control unit, a current duty for driving a hydraulic control valve and a current component of a motor for driving a master cylinder according to the state of the brake and whether the current temperature value is in the low temperature state.

11 Claims, 4 Drawing Sheets

(56) References Cited

U.S. PATENT DOCUMENTS

| | | | | |
|---|---|---|---|---|
| 2013/0291830 A1* | 11/2013 | Doering | ............... | B60W 10/10 |
| | | | | 123/350 |
| 2015/0061366 A1* | 3/2015 | Shimada | ................ | B60T 7/042 |
| | | | | 303/15 |
| 2015/0224845 A1* | 8/2015 | Anderson | ............ | B60G 17/019 |
| | | | | 701/37 |
| 2016/0094180 A1* | 3/2016 | Ajima | .................... | B62D 5/065 |
| | | | | 318/504 |
| 2016/0121867 A1* | 5/2016 | Jung | .................... | B60T 13/146 |
| | | | | 701/78 |
| 2017/0361823 A1* | 12/2017 | Kim | ...................... | B60T 13/161 |
| 2018/0022332 A1* | 1/2018 | Sonoda | ................ | B60T 13/146 |
| | | | | 303/15 |
| 2018/0050670 A1* | 2/2018 | Feigel | .................... | B60T 7/042 |
| 2018/0215366 A1* | 8/2018 | Leiber | .................. | B60T 13/686 |
| 2018/0229707 A1* | 8/2018 | Son | .......................... | B60T 8/00 |
| 2018/0244260 A1* | 8/2018 | Ruybal | ................ | B60W 10/02 |
| 2018/0290636 A1* | 10/2018 | Watanabe | ........... | B60T 8/17616 |
| 2018/0304872 A1* | 10/2018 | Kim | ...................... | B60T 8/4081 |
| 2019/0001942 A1* | 1/2019 | Spieker | .................. | B60T 8/171 |
| 2019/0039579 A1* | 2/2019 | Ohkubo | ............... | B60T 13/586 |
| 2019/0100183 A1* | 4/2019 | Jung | ..................... | B60T 13/166 |
| 2019/0111790 A1* | 4/2019 | Crombez | ................ | B60T 8/268 |
| 2019/0154439 A1* | 5/2019 | Binder | ................... | G01B 11/26 |
| 2019/0174207 A1* | 6/2019 | Cella | ........................ | H04Q 9/00 |
| 2019/0331032 A1* | 10/2019 | McConville | ............ | F02D 13/06 |
| 2021/0001829 A1* | 1/2021 | Seol | ........................ | B60T 8/171 |
| 2022/0144241 A1* | 5/2022 | Ortmann | ................ | F02D 28/00 |

\* cited by examiner

METHOD FOR CONTROLLING ESC INTEGRATED BRAKING SYSTEM

CROSS-REFERENCE TO RELATED APPLICATION

This application claims priority from and the benefit of Korean Patent Application No. 10-2019-0079194, filed on Jul. 2, 2019, which is hereby incorporated by reference for all purposes as if set forth herein.

BACKGROUND

Field

Exemplary embodiments relate to a method for controlling an ESC integrated braking system, and more particularly, to a method for controlling an ESC integrated braking system, which increase the temperature of an actuator at low temperature to lower viscosity of a brake fluid, thereby improving responsiveness of a brake to ensure a braking force according to driver's braking intention.

Discussion of the Background

In general, a brake system includes an anti-lock brake system (ABS) that prevents wheel slip during braking, a brake traction control system (BTCS) that prevents slip of driving wheels during sudden unintended acceleration or sudden acceleration of a vehicle, a vehicle attitude control system (ESC: Electronic Stability Control System) that stably maintains the travel state of a vehicle by controlling brake fluid pressure by combining the anti-lock brake system and the traction control, and the like.

However, in a brake system using a brake fluid like the ESC integrated braking system, since the viscosity of the brake fluid increases at low temperature, time is delayed (increase in low-temperature fluidity) until pressure generated in a master cylinder is transferred to wheels through an inlet valve with an orifice (a small hole for ejecting a fluid), resulting in a feeling of slip.

In this regard, various methods have been developed to solve the aforementioned problem occurring at low temperature, but in the case of a method in which a vehicle generates slight pressure before braking, or regenerative braking or an engine braking force is used, since a brake fluid is kept in a low temperature state, braking performance is degraded in emergency braking or immediately before vehicle stop in which a regenerative braking force is lost, so that driver's safety may not be guaranteed.

Furthermore, a method of adding a heating wire to a hydraulic pipe has an effect of lowering the viscosity of a brake fluid, but has a problem of increasing the cost by requiring additional parts. Furthermore, a method of compensating for viscosity by applying a DC current to a motor to heat the motor when there is no steering intention of a driver is not applied to when there is a steering intention of a driver, and thus has a limitation in lowering the viscosity of a brake fluid due to the lack of continuity of heat generation. Furthermore, a method of increasing the temperature of an actuator by setting target pressure to be high when a vehicle stops has a problem in that heat generation is not possible while the vehicle travels.

In this regard, there is a need for a method of lowering the viscosity of a brake fluid by increasing the temperature of an actuator (that is, a valve) even when braking at low temperature (or extremely low temperature) or when not braking (or waiting).

The background art of the present disclosure is disclosed in Korean Patent Application Laid-Open No. 10-1997-0000784 A (published on Jan. 21, 1997 and entitled "Power control device for automobiles").

The above information disclosed in this Background section is only for enhancement of understanding of the background of the invention and, therefore, it may contain information that does not constitute prior art.

SUMMARY

Exemplary embodiments provide a method for controlling an ESC integrated braking system, which increases the temperature of an actuator at low temperature to lower viscosity of a brake fluid, thereby improving responsiveness of a brake to ensure a braking force according to driver's braking intention.

Additional features of the invention will be set forth in the description which follows, and in part will be apparent from the description, or may be learned by practice of the invention.

An exemplary embodiment of the present invention provides a method for controlling an ESC integrated braking system including: checking, by a control unit, whether a brake is in an on state or a standby state as the braking system is activated; checking, by the control unit, whether current temperature is in a low temperature state lower than specified reference temperature; and controlling, by the control unit, a current duty for driving a hydraulic control valve and a current component of a motor for driving a master cylinder according to the state of the brake and whether the current temperature is in the low temperature state.

When the brake is in the standby state and the current temperature is not in the low temperature state, the control unit may perform minimum duty control for maintaining an operation state of at least one constantly-operated hydraulic control valve specified in advance.

The at least one constantly-operated hydraulic control valve may be a hydraulic control valve specified in order to form pressure and pedal feel during a brake operation.

When the brake is in the standby state and the current temperature is in the low temperature state, the control unit may apply a magnetic flux contributing component current $i_d$, which is a remaining current obtained by excluding a minimum torque contributing component current $i_q$ from a maximum current $i_s$ capable of constantly operating the motor, to the motor as a current for preventing a piston of a master cylinder from moving forward, and drives all hydraulic control valves and inlet valves of the ESC integrated braking system while performing maximum duty control capable of constantly operating the valves.

The magnetic flux contributing component current $i_d$ applied to the motor is a root (SQRT) value ($i_d = \sqrt{i_s^2 - i_q^2}$) of a value obtained by subtracting a square value $i_q^2$ of the torque contributing component current $i_q$ from a square value $i_s^2$ of the maximum current $i_s$ capable of constantly operating the motor for driving the master cylinder.

The method may further include: when the brake is in the on state, calculating, by the control unit, required pressure corresponding to displacement detected by a pedal stroke sensor, in order to adjust a current component of the motor for driving the master cylinder according to displacement of a pedal.

The method may further include, in order to check whether the current temperature is in the low temperature state in the brake-on state: checking, by the control unit, whether a difference between estimated master cylinder pressure Pme and master cylinder pressure Pm at room temperature is larger than a specified reference; and determining, by the control unit, that the current temperature is in the low temperature state when the difference between the estimated master cylinder pressure Pme and the master cylinder pressure Pm at the room temperature is larger than the specified reference.

The estimated master cylinder pressure Pme is calculated using Equation 1 below, $$Pme = Pw + k*V + k1*V^2 \qquad \text{Equation 1}$$

where Pme denotes the estimated master cylinder pressure, Pw denotes wheel pressure, V denotes a piston speed, and k/k1 denotes a constant associated with temperature characteristics of a valve orifice and a brake fluid.

When the brake is in the on state and the current temperature is not in the low temperature state, the control unit may control the magnetic flux contributing component current $i_d$ during vector control of the motor for driving the master cylinder to be 0 ($i_d$=0), and performs minimum duty control for maintaining the operation state of the at least one constantly-operated hydraulic control valve specified in advance.

In a case where the brake is in the on state and the current temperature is in the low temperature state, when the torque contributing component current $i_q$ for vector control of the motor is larger than the maximum current $i_s$ capable of constantly operating the motor, the control unit controls the magnetic flux contributing component current $i_d$ during the vector control of the motor for driving the master cylinder to be 0 ($i_d$=0), and performs minimum duty control for maintaining the operation state of the at least one constantly-operated hydraulic control valve specified in advance.

In the case where the brake is in the on state and the current temperature is in the low temperature state, when the torque contributing component current $i_q$ is smaller than the maximum current $i_s$ capable of constantly operating the motor for driving the master cylinder, the control unit applies the root (SQRT) value ($i_d = \sqrt{i_s^2 - i_q^2}$) of the value, which is obtained by subtracting the square value $i_q^2$ of the torque contributing component current $i_q$ from the square value $i_s^2$ of the maximum current $i_s$ capable of constantly operating the motor for driving the master cylinder, to the motor as a component current.

When the brake is in the on state and the current temperature is in the low temperature state, the control unit performs maximum duty control for maintaining the operation state of the at least one constantly-operated hydraulic control valve specified in advance.

According to the inventive concepts, it is possible to improve responsiveness of a brake by increasing the temperature of an actuator at low temperature to lower viscosity of a brake fluid, thereby ensuring a braking force according to driver's braking intention and improving pedal feel at low temperature.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, a method for controlling an ESC integrated braking system in accordance with an embodiment of the present disclosure will be described below with reference to the accompanying drawings.

It should be noted that the drawings are not to precise scale and may be exaggerated in thickness of lines or sizes of components for descriptive convenience and clarity only. Furthermore, the terms as used herein are defined by taking functions of the disclosure into account and can be changed according to intention of users or operators or practice. Therefore, definition of the terms should be made according to the overall disclosures set forth herein.

Figure 1:
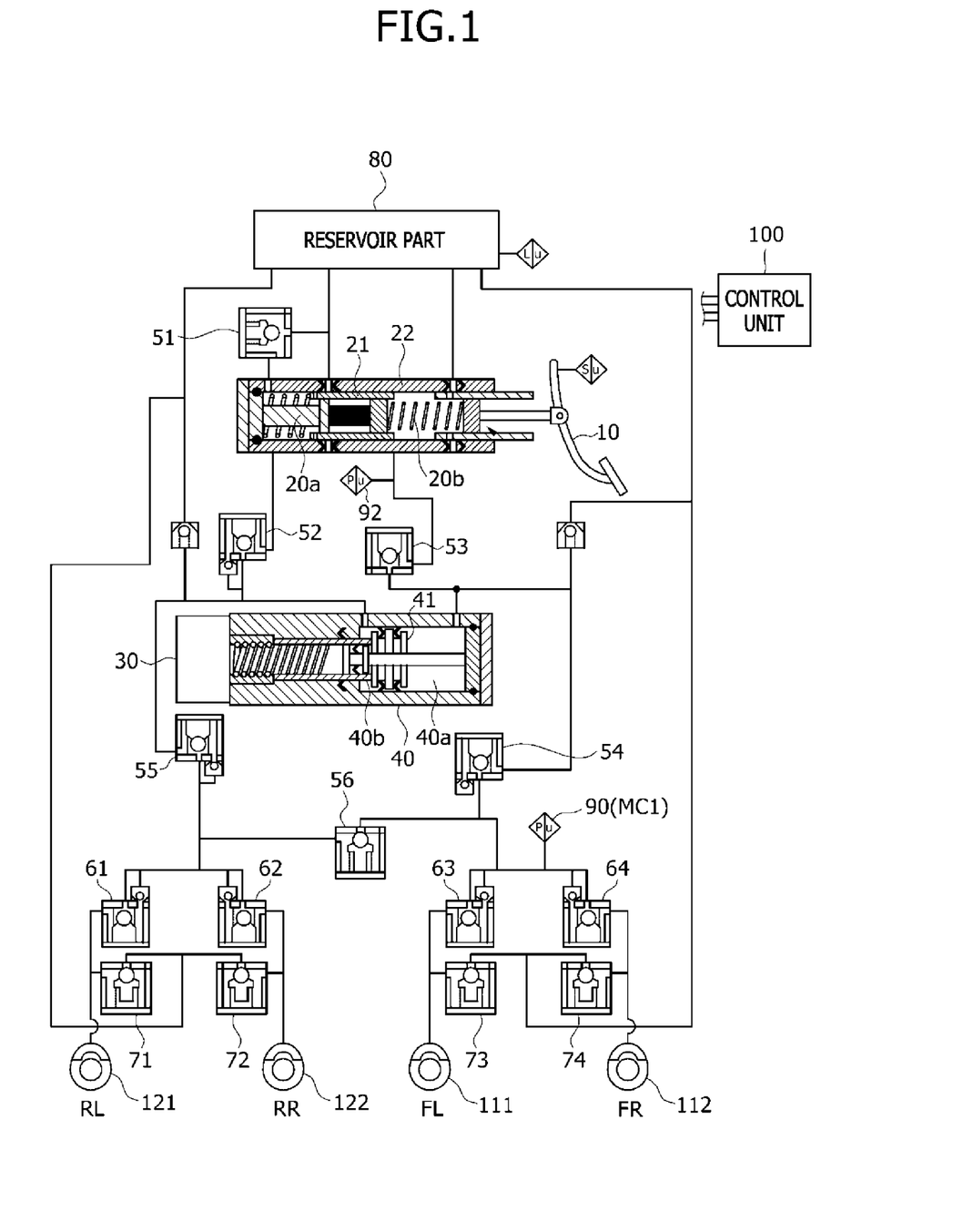
FIG. 1 is a diagram schematically illustrating a configuration of an ESC integrated braking system in accordance with an embodiment of the present disclosure.

FIG. 1 is a diagram schematically illustrating a configuration of an ESC integrated braking system in accordance with an embodiment of the present disclosure.

As illustrated in FIG. 1, a device for controlling the ESC integrated braking system in accordance with an embodiment of the present disclosure includes a reservoir part 80, a pedal cylinder part 20, a motor 30, a master cylinder part 40, wheel cylinders 111, 112, 121, and 122, hydraulic control valves 51 to 56, and a control unit 100.

The reservoir part 80 is coupled to an upper portion of the pedal cylinder part 20 to store oil.

The reservoir part 80 may include a reservoir liquid level sensor Lu.

The pedal cylinder part 20 generates hydraulic pressure as a brake pedal 10 is pressed.

The pedal cylinder part 20 includes a pedal cylinder 22 and a pedal simulator 21, and may form two chambers 20a and 20b. As an example, the pedal cylinder part 20 may include a first chamber 20a and a second chamber 20b.

For example, when a driver's stepping force is applied to the brake pedal 10, hydraulic pressure is generated by the pedal cylinder 22 and the generated hydraulic pressure is supplied to a piston of the pedal simulator 21, so that an elastic body of the pedal simulator 21 is pressed and driver's pedal feel is implemented by a reaction force of the pressed elastic body.

The motor 30 operates by an electrical signal outputted corresponding to displacement of the brake pedal 10.

The control unit 100 may control the driving of the motor 30 by receiving a rotation sensing signal of the brake pedal 10.

The master cylinder part 40 is driven by the motor 30 controlled by the control unit 100 to generate hydraulic pressure, and supplies the hydraulic pressure to the wheel cylinders 111, 112, 121, and 122 that perform the braking of wheels RR, RL, FR, and FL.

The control unit 100 may be an electronic control unit (ECU) which is a representative control device of a vehicle.

For example, when a driver presses the brake pedal 10, a pedal stroke sensor Su senses the stroke of the brake pedal 10 and transmits the sensed stroke to the control unit 100, and the control unit 100 controls the hydraulic pressure generated by the master cylinder part 40 by controlling the motor 30 based on a stroke distance (or displacement) of the brake pedal 10 sensed by the pedal stroke sensor.

At this time, the motor 30 operates under the control of the control unit 100 in order to form braking hydraulic pressure based on signals outputted from the pedal stroke sensor Su and a pedal cylinder pressure sensor 92 as the brake pedal 10 is pressed.

The master cylinder part 40 may include a master piston 41 and form two chambers 40a and 40b. As an example, the master cylinder part 40 may include a third chamber 40a and a fourth chamber 40b.

The wheel cylinders 111, 112, 121, and 122 include a first wheel cylinder 111 for braking the front left wheel FL of the vehicle, a second wheel cylinder 112 for braking the front right wheel FR of the vehicle, a third wheel cylinder 121 for braking the rear left wheel RL of the vehicle, and a fourth wheel cylinder 122 for braking the rear right wheel RR of the vehicle.

Inlet valves 61 to 64 are provided to control brake oil supplied to the respective wheel cylinders 111, 112, 121, and 122, and outlet valves 71 to 74 are provided in hydraulic fluid paths between the respective wheel cylinders 111, 112, 121, and 122 and the reservoir part 80 in order to control brake oil discharged from the respective wheel cylinders 111, 112, 121, and 122.

The hydraulic control valves 51 to 56 are provided in the hydraulic fluid paths and are opened and closed under the control of the control unit 100. Such hydraulic control valves 51 to 56 may include first to sixth hydraulic control valves.

The first hydraulic control valve 51 is provided in a hydraulic fluid path connecting between the reservoir part 80 and the first chamber 20a of the pedal cylinder part 20, and is opened and closed under the control of the control unit 100 to adjust hydraulic pressure.

The second hydraulic control valve 52 is provided in a hydraulic fluid path connecting between the first chamber 20a of the pedal cylinder part 20 and the fourth chamber 40b of the master cylinder part 40, and is opened and closed under the control of the control unit 100 to adjust hydraulic pressure.

The third hydraulic control valve 53 is provided in a hydraulic fluid path connecting between the second chamber 20b of the pedal cylinder part 20 and the third chamber 40a of the master cylinder part 40, and is opened and closed under the control of the control unit 100 to adjust hydraulic pressure.

The fourth hydraulic control valve 54 is provided in a hydraulic fluid path connecting between the third chamber 40a of the master cylinder part 40 and the wheel cylinder, and is opened and closed under the control of the control unit 100 to adjust hydraulic pressure.

The fifth hydraulic control valve 55 is provided in a hydraulic fluid path connecting between the fourth chamber 40b of the master cylinder part 40 and the wheel cylinder, and is opened and closed under the control of the control unit 100 to adjust hydraulic pressure.

The sixth hydraulic control valve 56 (or a split shutoff valve) is provided in a hydraulic fluid path connecting between the fourth hydraulic control valve 54 and the wheel cylinders 121 and 122 and a hydraulic fluid path connecting between the fifth hydraulic control valve 55 and the wheel cylinders 111 and 112, and is opened and closed under the control of the control unit 100 to adjust hydraulic pressure.

The hydraulic fluid path connecting between the fourth hydraulic control valve 54 and the wheel cylinders 121 and 122 is connected to the fourth chamber 40b of the master cylinder part 40 and guides the hydraulic pressure to the third and fourth wheel cylinders 121 and 122 mounted on the two rear wheels RL and RR, respectively. Furthermore, the hydraulic fluid path connecting between the fourth hydraulic control valve 54 and the wheel cylinders 121 and 122 may be provided with a second pressure sensor 95 for measuring the hydraulic pressure. The second pressure sensor 95 may be deleted to reduce cost.

The hydraulic fluid path connecting between the fifth hydraulic control valve 55 and the wheel cylinders 111 and 112 is connected to the third chamber 40a of the master cylinder part 40 and guides the hydraulic pressure to the first and second wheel cylinders 111 and 112 mounted on the two front wheels FL and FR, respectively. Furthermore, the hydraulic fluid path connecting between the fifth hydraulic control valve 55 and the wheel cylinders 111 and 112 may be provided with a first pressure sensor 90 for measuring the hydraulic pressure.

The aforementioned first to sixth hydraulic control valves 51 to 56 may be constantly operated valves and may be made of solenoid valves controlled by the control unit 100.

Furthermore, the sixth hydraulic control valve 56 (or the split shutoff valve) is a line split valve and may set a string force capable of maintaining pressure at a certain level or more in an off state.

Hereinafter, the structure of the ESC integrated braking system configured as described above will be outlined. When a driver's stepping force is applied to the brake pedal 10, hydraulic pressure is generated by the pedal cylinder part 20 and the generated hydraulic pressure is supplied to the piston of the pedal simulator 21, so that the elastic body of the pedal simulator 21 is pressed and driver's pedal feel is implemented by the reaction force of the pressed elastic body. At this time, the motor 30 operates under the control of the control unit 100 in order to form braking hydraulic pressure based on signals outputted from the pedal stroke sensor Su and the pedal cylinder pressure sensor 92 as the brake pedal 10 is pressed, and the master cylinder part 40 forms the braking hydraulic pressure through the master piston 41 that moves forward and backward by the motor 30.

Hereinafter, a method of increasing the temperature of an actuator (that is, a valve) at low temperature by using the ESC integrated braking system will be described.

Figure 2:
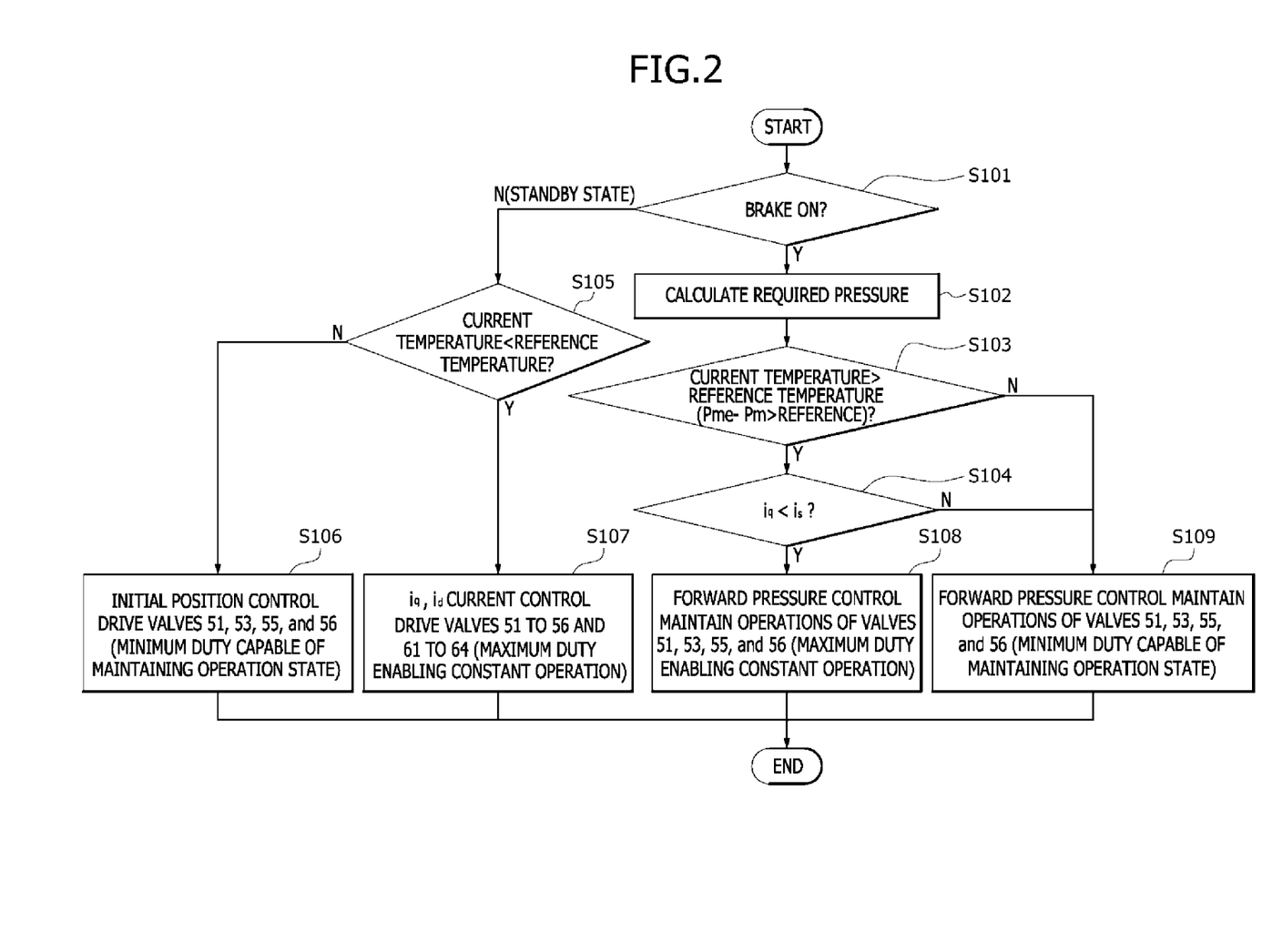
FIG. 2 is a flowchart for explaining a method for controlling the ESC integrated braking system in accordance with an embodiment of the present disclosure.
Figure 3:
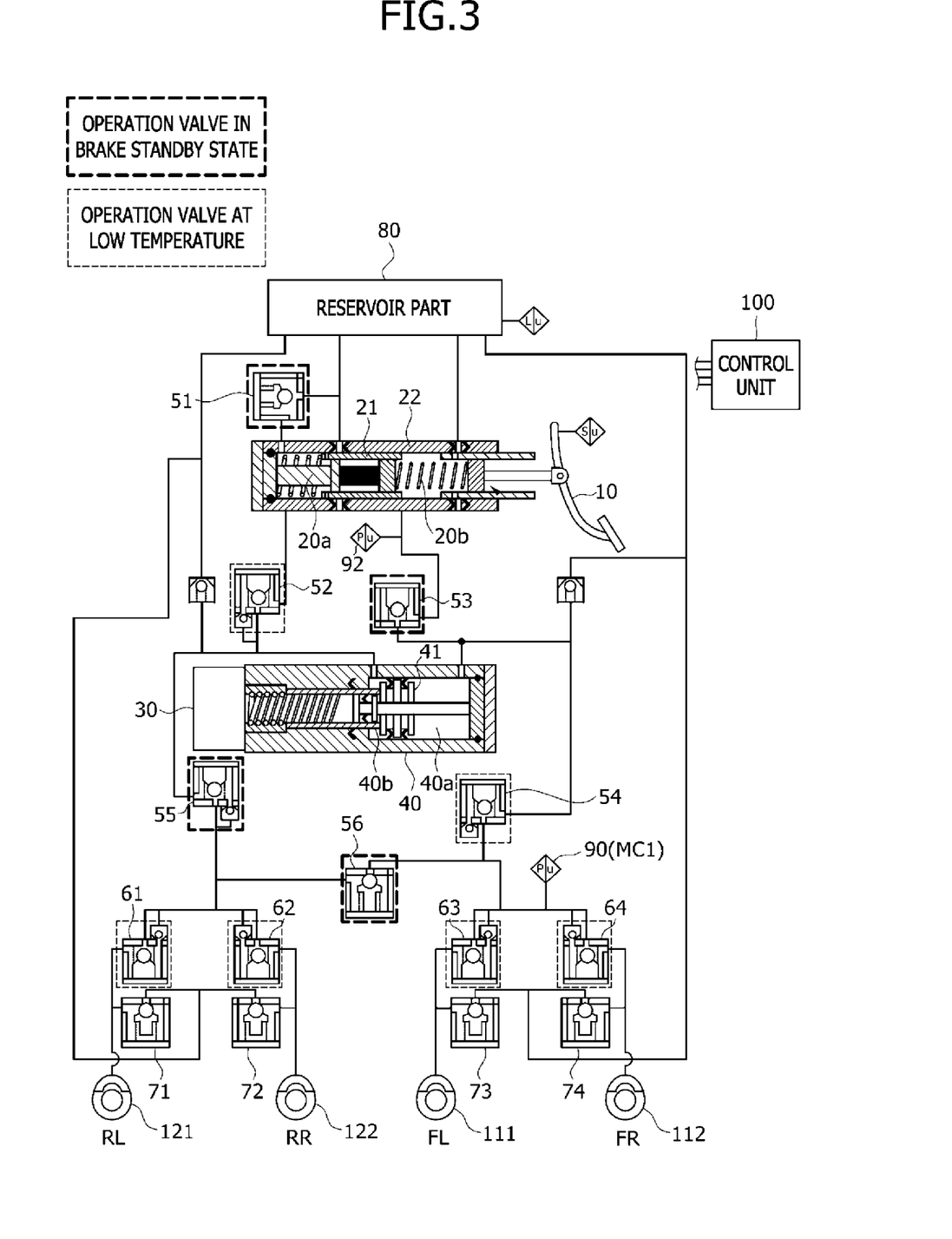
FIG. 3 is an exemplary diagram illustrating operation valves in a brake standby state in FIG. 2.
Figure 4:
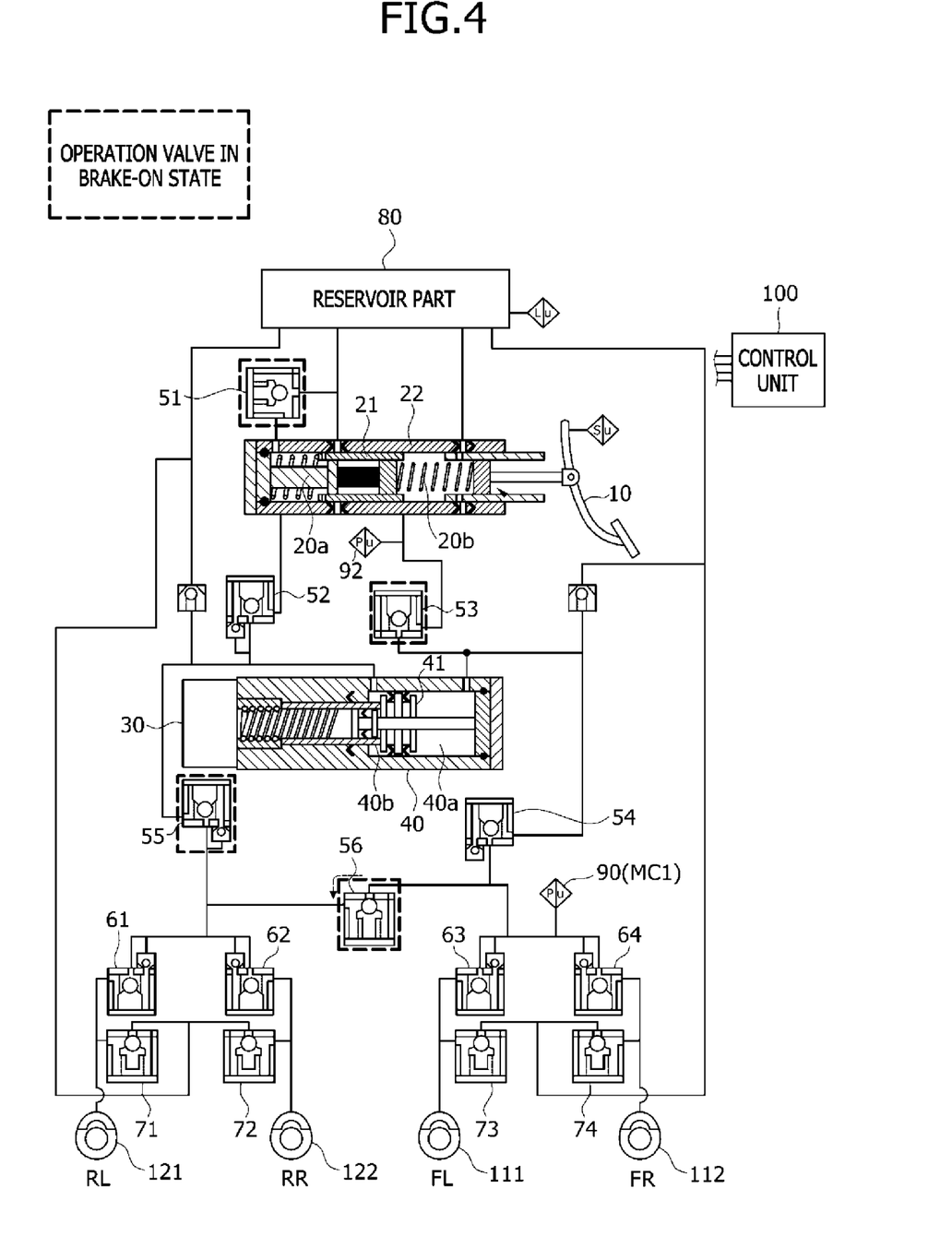
FIG. 4 is an exemplary diagram illustrating operation valves in a brake-on state in FIG. 2.

FIG. 2 is a flowchart for explaining a method for controlling the ESC integrated braking system in accordance with an embodiment of the present disclosure, FIG. 3 is an exemplary diagram illustrating operation valves in a brake standby state in FIG. 2, and FIG. 4 is an exemplary diagram illustrating operation valves in a brake-on state in FIG. 2.

The ESC integrated braking system in accordance with an embodiment is activated when a specified condition (for example, door open, IGN on, or input of a break light switch (BLS) signal) is satisfied.

Referring to FIG. 2, the control unit 100 checks whether the braking system is in a brake-on (operation) state or not (that is, a standby state) (S101).

As a result of the check (S101), when the braking system is in the brake-on (operation) state, the control unit 100 calculates required pressure (that is, required pressure corresponding to displacement detected by the pedal stroke sensor Su) (S102).

Then, the control unit 100 checks whether the current temperature is lower than specified reference temperature (that is, current temperature<reference temperature) or a difference between estimated master cylinder pressure Pme and master cylinder pressure Pm at room temperature is larger than a specified reference (S103).

When the current temperature is lower than the specified reference temperature (that is, the current temperature<the reference temperature) or the difference between the estimated master cylinder pressure Pme and the master cylinder pressure Pm at room temperature is larger than the specified reference (Y in S103), the control unit 100 may determine that the current temperature is in a low temperature state.

The estimated master cylinder pressure Pme may be calculated using Equation 1 below.

$$Pme = Pw + k*V + k1*V^2 \qquad \text{Equation 1}$$

In Equation 1 above, Pme denotes the estimated master cylinder pressure (equal to measured pressure of MC1 at room pressure), Pw denotes wheel pressure (value converted from piston displacement and caliper required liquid level), V denotes a piston speed, and k/k1 denotes a constant associated with a valve orifice and a brake fluid (temperature characteristics).

Meanwhile, in a case where the current temperature is in the low temperature state when the brake is on (Y in S103), the control unit 100 checks whether a torque contributing component current $i_q$ during vector control of the motor 30 is smaller than a maximum current $i_s$ capable of constantly operating the motor 30 (S104).

As a result of the checks (S103 and S104), even though the current temperature is not in the low temperature state when the brake is on (N in S103) (that is, room temperature state or the current temperature≥the reference temperature) and the current temperature is in the low temperature state when the brake is on (Y in S103), when the torque contributing component current $i_q$ is larger than the maximum current $i_s$ capable of constantly operating the motor 30 (N in S104), the control unit 100 controls a magnetic flux contributing component current $i_d$ to be 0 ($i_d$=0) and performs minimum duty control for maintaining the operation states of the first, third, fifth, and sixth hydraulic control valves 51, 53, 55, and 56 (S109) (see FIG. 4).

That is, in a case where the current temperature is not lower than the specified reference temperature when the brake is on (that is, in a room temperature state), the control unit 100 performs the minimum duty control for maintaining the operation states of the hydraulic control valves 51, 53, 55, and 56 which are constantly operated in order to form pressure and pedal feel during a brake operation. Furthermore, when the torque contributing component current $i_q$ required for controlling the pressure of the piston 41 becomes larger than the maximum current $i_s$ capable of constantly operating the motor 30, the control unit 100 controls the magnetic flux contributing component current $i_d$ to be 0 (S109) (that is $i_s \leq i_q$ and $i_d$=0).

As a result of the checks (S103 and S104), when the current temperature is in the low temperature state when the brake is on (Y in S103) and the torque contributing component current $i_q$ is smaller than the maximum current $i_s$ capable of constantly operating the motor 30 (Y in S104), the control unit 100 controls the magnetic flux contributing component current $i_d$ to be the root (SQRT) value (that is, $i_d = \sqrt{i_s^2 - i_q^2}$) of a value obtained by subtracting the square value $i_q^2$ of the torque contributing component current $i_q$ from the square value $i_s^2$ of the maximum current $i_s$ capable of constantly operating the motor 30, and performs maximum duty control (that is, maximum duty enabling a constant operation) for maintaining the operation states of the first, third, fifth, and sixth hydraulic control valves 51, 53, 55, and 56 (S108) (see FIG. 4).

That is, in a case where the current temperature is lower than the specified reference temperature when the brake is on (that is, in the low temperature state), the control unit 100 performs maximum duty control capable of constantly operating the hydraulic control valves 51, 53, 55, and 56 which are constantly operated in order to form pressure and pedal feel during the brake operation. Furthermore, the control unit 100 continuously applies the magnetic flux contributing component current $i_d$ to the motor 30 as a remaining current obtained by excluding the torque contributing component current $i_q$ required for controlling the pressure of the piston 41 from the pre-calculated maximum current $i_s$ capable of constantly operating the motor 30 (S108).

As a result of the check (S101), when the braking system is not in the brake-on (operation) state (that is, in a standby state) (N in S101), the control unit 100 checks whether the current temperature in the brake standby state is lower than specified reference temperature (that is, in the low temperature state) (S105).

The current temperature may be detected using temperature sensors (not illustrated) embedded in the pressure sensors 90, 92, and 95.

Accordingly, as a result of the check (S105), when the current temperature in the brake standby state is not in the low temperature state (Y in S105) (that is, in a room temperature state or the current temperature the reference temperature), the control unit 100 performs, as an initial position control operation, the minimum duty control for maintaining the operation states of the first, third, fifth, and sixth hydraulic control valves 51, 53, 55, and 56 (S106) (operation valves during brake standby in FIG. 3).

That is, when the ESC integrated braking system is activated, the control unit 100 performs piston position initialization in order to detect the mechanical origin position of the piston 41 in the master cylinder part 40, locates the piston 41 in the standby position, and then applies a duty specified for valve operation noise reduction when the brake is on to the hydraulic control valves 51, 53, 55, and 56, which are constantly operated in order to form pressure and pedal feel during a brake operation, thereby pre-operating the hydraulic control valves 51, 53, 55, and 56. At this time, the valve duty for pre-operating the hydraulic control valves 51, 53, 55, and 56 is a minimum duty for maintaining the operation states thereof in order to minimize current consumption.

As a result of the check (S101), when the braking system is not in the brake-on (operation) state (that is, in a brake standby state) (N in S101) and the current temperature is lower than the specified reference temperature (that is, in the low temperature state) (Y in S105), the control unit 100 performs a control operation of the torque contributing component current $i_q$ and the magnetic flux contributing component current $i_d$, that is, controls the magnetic flux contributing component current $i_d$ to be the root (SQRT) value (that is, $i_d = \sqrt{i_s^2 - i_q^2}$) of the value obtained by subtracting the square value $i_q^2$ of the torque contributing component current $i_q$ from the square value $i_s^2$ of the maximum current $i_s$ capable of constantly operating the motor 30, and drives all the first to sixth hydraulic control valves 51 to 56 and the inlet valves 61 to 64, that is, performs maximum duty control capable of constantly operating the valves (S107) (see operation valves during brake standby in FIG. 3).

That is, when the current temperature is lower than the specified reference temperature (that is, in the low temperature state), the control unit 100 applies the magnetic flux contributing component current $i_d$ to the motor 30 as a remaining current obtained by excluding the minimum torque contributing component current $i_q$ from the maximum current $i_s$ capable of constantly operating the motor 30 such that the piston 41 is not moved forward in consideration of a motor angle deviation among pre-calculated maximum currents capable of constantly operating the motor 30.

At this time, the relation among the maximum current $i_s$ capable of constantly operating the motor 30, the torque contributing component current $i_q$, and the magnetic flux contributing component current $i_d$ is expressed by Equation 2 below.

$$i_s = \sqrt{i_q^2 + i_d^2}, i_d = \sqrt{i_s^2 - i_q^2} \qquad \text{Equation 2}$$

In Equation 2 above, $i_s$ denotes the maximum current capable of constantly operating the motor 30, $i_q$ denotes the torque contributing component current, and $i_d$ denotes the magnetic flux contributing component current.

Furthermore, as described above, when the current temperature is lower than the reference temperature in the brake standby state (that is, in the low temperature state), the control unit 100 performs maximum duty control capable of constantly operating all the hydraulic control valves 51 to 56 and the inlet valves 61 to 64 which affect a brake operation when the brake is on. Accordingly, when the motor 30 and the hydraulic control valves 51 to 56 and the inlet valves 61 to 64 continue to generate heat and the temperature of the actuator reaches specified temperature that is not affected by low temperature fluidity, the control unit 100 controls the motor 30 to be switched to a standby position and performs minimum duty control for operating the hydraulic control valves 51, 53, 55, and 56 which are constantly operated.

As described above, when controlling the motor 30, the present embodiment uses the vector control of controlling the motor 30 by calculating the component current ($i_q$, q-axis current) contributing to torque and the component current ($i_d$, d-axis current) contributing only to magnetic flux in order to improve control performance, and when controlling the motor 30 (for example, BLAC motor). Therefore, the present embodiment can continuously apply the component current contributing only to magnetic flux up to the current limit, in which constant driving is possible, to increase the temperature of the actuator even during non-braking or braking, thereby lowering the viscosity of the brake fluid and improving braking performance at low temperature.

Furthermore, since the hydraulic control valves are the most affected parts as the viscosity of the brake fluid increases, a maximum current enabling a constant operation is applied even to a valve, which is constantly operated, and a valve, which is not constantly operated, by classifying braking/non-braking situations, so that it is possible to additionally reduce the viscosity.

Although the present disclosure have been described with reference to the embodiments illustrated in the drawings, the embodiments of the disclosure are for illustrative purposes only, and those skilled in the art will appreciate that various modifications and other equivalent embodiments are possible. Thus, the true technical scope of the disclosure should be defined by the following claims. Furthermore, the implementations described in the present specification may be implemented with a method or process, an apparatus, a software program, and a data stream or signal, for example. Although discussed only in the context of a single form of implementation (for example, discussed only as a method), implementations of the discussed features may also be implemented as other forms (for example, an apparatus or a program). The apparatus may be implemented with appropriate hardware, software, firmware and the like. The method may be implemented in an apparatus such as a processor generally referring to a processing device including a computer, a microprocessor, an integrated circuit, or a programmable logic device. The processor includes a communication device such as a computer, a cellular phone, a portable/personal digital assistants (PDA), and other devices that facilitate communication of information between end users.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. A method for controlling an ESC integrated braking system, the method comprising:
    checking, by a control unit, whether a brake is in an on state or a standby state as the braking system is activated;
    checking, by the control unit, whether a current temperature value is in a low temperature state lower than specified reference temperature value; and
    controlling, by the control unit, a current duty for driving a hydraulic control valve and a current component of a motor for driving a master cylinder according to the state of the brake and whether the current temperature value is in the low temperature state,
    wherein, when the brake is in the on state and the current temperature value is in the low temperature state, the control unit performs maximum duty control for maintaining the operation state of the at least one constantly-operated hydraulic control valve specified in advance.

2. The method according to claim 1, wherein, when the brake is in the standby state and the current temperature value is not in the low temperature state, the control unit performs minimum duty control for maintaining the operation state of the at least one constantly-operated hydraulic control valve specified in advance.

3. The method according to claim 2, wherein the at least one constantly-operated hydraulic control valve is a hydraulic control valve specified in order to form pressure and pedal feel during a brake operation.

4. The method according to claim 1, wherein, when the brake is in the standby state and the current temperature value is in the low temperature state, the control unit:
    applies a magnetic flux contributing component current $i_d$, which is a remaining current obtained by excluding a minimum torque contributing component current $i_q$ from a maximum current $i_s$ capable of constantly operating the motor, to the motor as a current for preventing a piston of a master cylinder from moving forward; and
    drives all hydraulic control valves and inlet valves of the ESC integrated braking system while performing maximum duty control capable of constantly operating the valves.

5. The method according to claim 4, wherein the magnetic flux contributing component current $i_d$ applied to the motor is a root (SQRT) value ($i_d=\sqrt{i_s^2-i_q^2}$) of a value obtained by subtracting a square value $i_q^2$ of the torque contributing component current $i_q$ from a square value $i_s^2$ of the maximum current $i_s$ capable of constantly operating the motor for driving the master cylinder.

6. The method according to claim 1, further comprising:
    when the brake is in the on state, calculating, by the control unit, a required pressure corresponding to a displacement detected by a pedal stroke sensor, in order to adjust a current component of the motor for driving the master cylinder according to the displacement of a pedal.

7. The method according to claim 1, further comprising, in order to check whether the current temperature value is in the low temperature state in the brake-on state:
    checking, by the control unit, whether a difference between estimated master cylinder pressure Pme and master cylinder pressure Pm at a room temperature value is greater than a specified reference value; and
    determining, by the control unit, that the current temperature value is in the low temperature state when the difference between the estimated master cylinder pressure Pme and the master cylinder pressure Pm at the room temperature value is greater than the specified reference value.

8. The method according to claim 7, wherein the estimated master cylinder pressure Pme is calculated using Equation 1 below, $$Pme=Pw+k*V+k1*V^2 \quad \text{Equation 1}$$

where Pme denotes the estimated master cylinder pressure, Pw denotes wheel pressure, V denotes a piston speed, and k/k1 denotes a constant associated with temperature characteristics of a valve orifice and a brake fluid.

9. The method according to claim 1, wherein, when the brake is in the on state and the current temperature value is not in the low temperature state, the control unit:
    controls the magnetic flux contributing component current $i_d$ during vector control of the motor for driving the master cylinder to be 0 ($i_d$=0); and
    performs minimum duty control for maintaining the operation state of the at least one constantly-operated hydraulic control valve specified in advance.

10. The method according to claim 1, wherein, in a case where the brake is in the on state and the current temperature value is in the low temperature state, when the torque contributing component current $i_q$ for vector control of the motor is greater than the maximum current $i_s$ capable of constantly operating the motor, the control unit controls the magnetic flux contributing component current $i_d$ during the vector control of the motor for driving the master cylinder to be 0 ($i_d$=0); and
    performs minimum duty control for maintaining the operation state of the at least one constantly-operated hydraulic control valve specified in advance.

11. The method according to claim 10, wherein, in the case where the brake is in the on state and the current temperature value is in the low temperature state, when the torque contributing component current $i_q$ is less than the maximum current $i_s$ capable of constantly operating the motor for driving the master cylinder,
    the control unit applies the root (SQRT) value ($i_d=\sqrt{i_s^2-i_q^2}$) of the value, which is obtained by subtracting the square value $i_q^2$ of the torque contributing component current $i_q$ from the square value $i_s^2$ of the maximum current $i_s$ capable of constantly operating the motor for driving the master cylinder, to the motor as a component current.

* * * * *